United States Patent [19]
Foster

[11] Patent Number: 4,621,840
[45] Date of Patent: Nov. 11, 1986

[54] SELF-LOCKING, SELECTIVELY RELEASABLE MECHANISM FOR LOCKING STRUCTURAL PARTS TOGETHER WITH LOAD RELIEVING RETENTION

[75] Inventor: Frank L. Foster, Lakewood, Colo.

[73] Assignee: Stanley Aviation Corporation, Aurora, Colo.

[21] Appl. No.: 547,132

[22] Filed: Oct. 31, 1983

[51] Int. Cl.⁴ .................................... F16L 15/00
[52] U.S. Cl. ............................... 285/81; 285/321; 285/233; 285/91; 285/92; 411/517; 411/530
[58] Field of Search ............... 285/81, 82, 89, 92, 285/321, 233, 234, 91; 137/512.1; 411/516, 517, 518, 521, 530, 353

[56] References Cited

U.S. PATENT DOCUMENTS

| Re. 18,144 | 8/1931 | Heiermann | 285/321 |
|---|---|---|---|
| 2,067,644 | 1/1937 | Olley et al. | 285/81 |
| 2,438,107 | 3/1948 | Babbitt | 285/321 |
| 2,845,106 | 7/1958 | Baker | 285/81 |
| 2,886,355 | 5/1959 | Wurzel | 285/321 |
| 3,395,934 | 8/1968 | Rosan et al. | 285/92 |
| 3,776,579 | 12/1973 | Gale | 285/233 |
| 3,965,926 | 6/1976 | Buckner | 137/512.1 |
| 4,470,735 | 9/1984 | Salisbury | 411/353 |

FOREIGN PATENT DOCUMENTS

| 1221842 | 9/1962 | France | 285/81 |
|---|---|---|---|
| 0618933 | 3/1949 | United Kingdom | 285/89 |

Primary Examiner—Cornelius J. Husar
Assistant Examiner—Eric K. Nicholson
Attorney, Agent, or Firm—Nies, Webner, Kurz & Bergert

[57] ABSTRACT

A retention for male and female structural members, including a self-locking selectively releasable locking spring wire or clip received in opposing grooves on the male and female members for locking the two members together, and interengaged threaded formations on the two members for absorbing a major portion of any force tending to axially separate the two members.

9 Claims, 6 Drawing Figures

SELF-LOCKING, SELECTIVELY RELEASABLE MECHANISM FOR LOCKING STRUCTURAL PARTS TOGETHER WITH LOAD RELIEVING RETENTION

FIELD OF INVENTION

This invention relates to structures for securing male and female parts together.

BACKGROUND

Prior to this invention, wire locks, snap rings and spring wire have been used for securing male and female parts together. The snap ring and spring wire type locks are usually arranged to seat in opposing circumferential grooves in the parts to be secured together to provide a positive lock between the parts. These devices have a common drawback in that they are subject to failure because they must withstand all of the forces tending to separate the interlocked parts.

SUMMARY AND OBJECTS OF INVENTION

With the foregoing in mind, the general aim and purpose of this invention is to provide a novel structure which overcomes the foregoing problem and which is easy to manipulate for securing male and female parts together and for separating the two parts.

In accordance with this invention, two retention mechanisms or structures are incorporated into the assembly for securing the male and female parts together, one being a threaded retention, and the other being a selectively releasable, locking spring retention. The arrangement of the two retention mechanisms is such that the threaded retention normally absorbs most of the separation forces. As a result, the locking spring is subjected to only a small proportion of the separating forces. Failure of the locking spring form is therefore less likely as compared with the prior structures mentioned above.

In the illustrated embodiment, the male part is threaded into the female part, and the locking spring seats in opposed grooves onto the two parts to provide a positive lock for releasably retaining the parts against relative axial displacement to one another. Owing to the threaded engagement of the two parts, forces tending to separate the two parts will be mostly absorbed by the threaded connection.

The locking spring form of this invention is provided with conveniently located free ends which are manually grippable for flexing the locking spring to a shape where it is completely removed from the groove in the female part. By holding the locking spring in this flexed condition, the male and female parts may be unthreaded from one another to thereby separate the two parts.

The special locking spring of this invention is selflocking in the same sense that as the male and female parts are threaded together, it is flexed and guided by engagement with an interior surface on the female part to snap into its locking position upon bringing the spring-receiving grooves into radial alignment with one another.

In an alternative embodiment, the locking spring form may be designed in such a manner that it is manually flexible to a shape where it is entirely removed from the groove in the male member, rather than the female member, to release the two parts from one another.

The present invention is particularly applicable for use in securing and locking together male and female fluid conveying parts such as the check valve and coupling parts shown in the illustrated embodiment. It will be appreciated, however, that the present invention may be utilized in a wide variety of other applications having male and female parts.

With the foregoing in mind, another important object of this invention resides in the provision of a novel assembly wherein a threaded retention is utilized with a special locking spring member to absorb most of force tending to separate the male and female parts which are secured together by the locking spring.

Further objects of this invention will appear as the description proceeds in connection with the below-described drawings and the appended claims.

DETAILED DESCRIPTION

Figure 1:
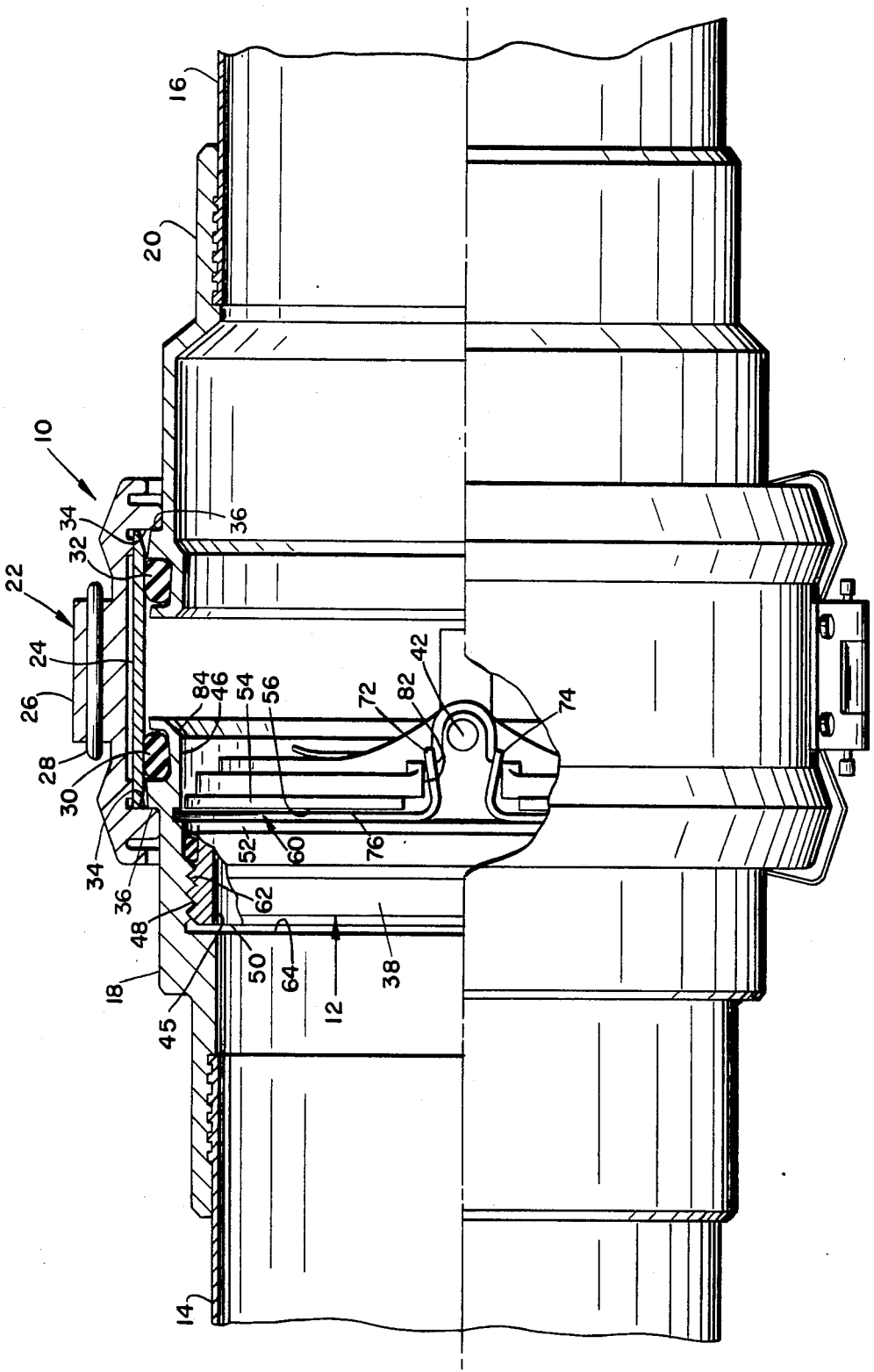
FIG. 1 is a partially sectioned side elevation of a combination coupler and check valve assembly incorporating the principles of this invention.
Figure 2:
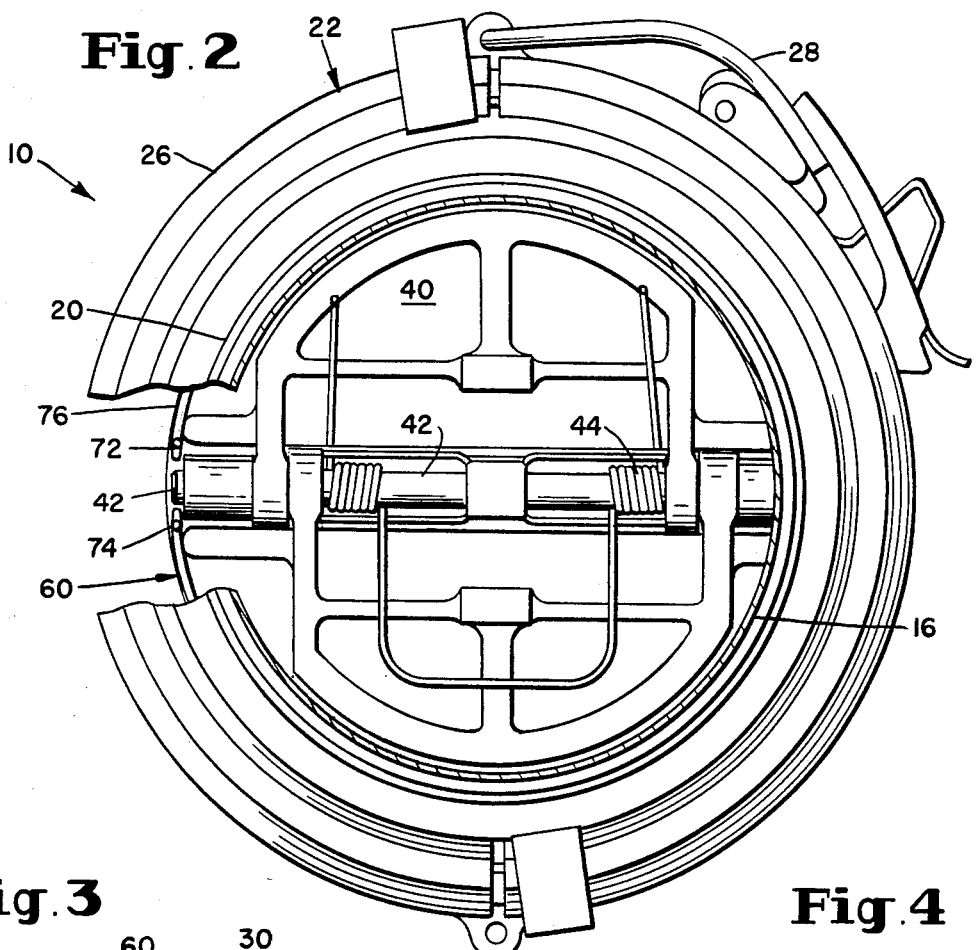
FIG. 2 is an end view of the assembly shown in FIG. 1.

Referring to FIGS. 1 and 2, the combination coupling and check valve mainly comprises a coupling assembly 10 and a check valve assembly 12. Coupling assembly 10 detachably couples a pair of fluid-conveying tubular members 14 and 16 together. Tubular members 14 and 16 may be pipes or conduits for conveying fluid under pressure. Check valve assembly 12 is housed in coupling assembly 10 in a manner described in detail below.

Coupling assembly 10 mainly comprises a pair of tubular coupling members or flanges 18 and 20 and a coupler unit 22. Coupling member 18 interfittingly and coaxially receives the adjacent end of tubular member 14 and is swagged or otherwise suitably fixed to tubular member 14 with a fluid-tight fit. Similarly, coupling member 20 interfittingly and coaxially receives the adjacent end of tubular member 16 and is swagged or otherwise suitably fixed to tubular member 16 with a fluid tight fit.

Except for the particular construction of coupling member 18, coupling assembly 10 may be of any suitable construction and is shown in the illustrated embodiment to be the same as the coupler described in U.S. Pat. No. 3,776,579 which issued to E. Gale on Dec. 4, 1973. U.S. Pat. No. 3,776,579 is hereby incorporated into this specification by reference.

As described in greater detail in the Gale patent, coupler unit 22 mainly comprises a retaining sleeve 24, a coupler sleeve 26 and a spring clip 28. O-rings 30 and 32 are mounted in grooves, of one or each of the coupling members 18 and 20.

Retaining sleeve 24 peripherally surrounds the adjacent ends of coupling members 18 and 20, axially bridges the space between seal rings 30 and 32, and compressively engages seal rings 30 and 32, whereby a fluid tight seal is established between sleeve 24 and each of the coupling members 18 and 20. Coupler sleeve 26 is longitudinally split to permit it to be mounted in a position where it peripherally surrounds retaining sleeve 24. Coupler sleeve 26 has radial shoulders 34 which are abuttable with radial shoulders 36 on coupling members 18 and 20 to limit relative axial movement of coupling members 18 and 20 away from each other under the influence of fluid pressure in the coupling. Sleeve 24 is axially confined between the radial shoulders 34 on the split coupler sleeve 26. Spring clip 28 is mounted on the split halves of coupler sleeve 26 and is selectively manipulatable to releasably secure the coupler halves together. Line fluid pressure tending to urge the coupled pipe ends axially away from each other causes the radial shoulders 36 on coupling members 18 and 20 to bear against the radial shoulders 34 on coupler 26.

Still referring to FIGS. 1 and 2, check valve assembly 12 is mounted in coupling member 18 and comprises a tubular housing 38, a flapper valve member 40, a flapper valve shaft or pin 42, and a flapper valve spring 44. Housing 38 is formed with a through passage 45 for conveying fluid. Shaft 42 is rotatably mounted on and extends diametrically of housing 38. Flapper valve member 40 is nonrotatably mounted on shaft 42 and is biased by spring 44 to a position where it seats with a fluid tight fit against an annular, axially directed seat on housing 38 to block flow of fluid through the coupling. Upstream pressure in tubular member 14, upon exceeding the downstream fluid pressure in tubular member 16, causes valve member 40 to rotate about the axis of shaft 42 to an open position where fluid communication is established between tubular members 14 and 16.

Figure 3:
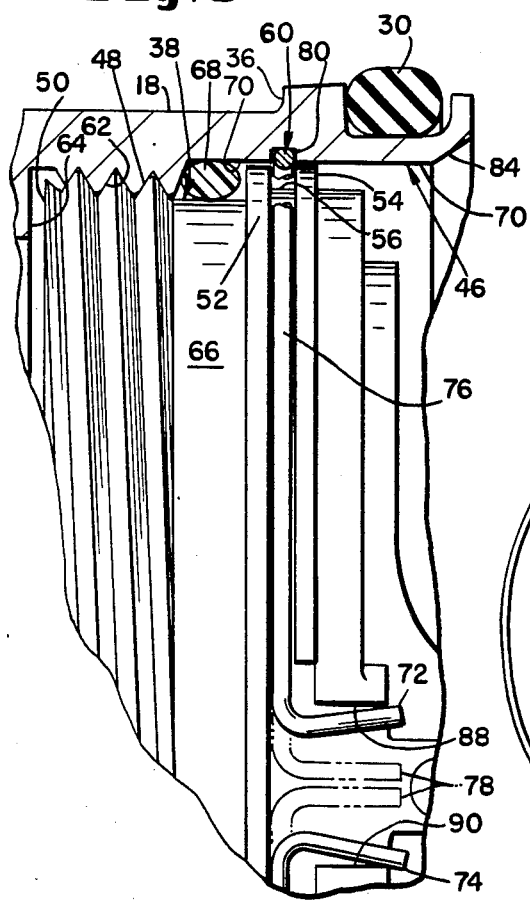
FIG. 3 is an enlarged fragmentary longitudinal section of the assembly shown in FIG. 1.

Referring to FIGS. 2 and 3, check valve housing 38 is coaxially received in a diametrically enlarged recessed end section 46 of coupling member 18 and has an externally threaded end section or formation 48 adjacent to its inner, flat end face 50. Near its opposite end, housing 38 is formed with a pair of axially spaced apart, radially outwardly extending, annular shoulders 52 and 54 which define a circumferentially extending outwardly opening groove 56 for receiving a locking spring member 60. Groove 56 is coaxial with the longitudinal axis of housing 38.

As shown in FIGS. 1 and 3, coupling member 18 is formed with an interior female threaded section or formation 62. Threaded section 62 peripherally surrounds check valve housing 38 and lies at the inner end of the coupling member's enlarged end section 46 adjacent to an annular axially directed shoulder 64 which faces end face 50 of housing 38. Threaded section 48 is threaded into section 62 to provide a threaded connection for securing housing 38 and coupling member 18 together. In general, coupling member 18 is a female part, and housing 38 is a male part received in the female part.

Still referring to FIGS. 1 and 3, housing 38 is formed with an exterior, cylindrically smooth, uniformly diametered external peripheral surface 66 extending axially between threaded section 48 and shoulder 52 and mounting a compressible O-ring 68. O-ring 68 is compressed between surface 66 and an interior cylindrical surface 70 which defines the coupling member's enlarged recessed section 46. O-ring 68 thus establishes a fluid tight seal between housing 38 and coupling member 18 to block leakage of fluid along a path extending between housing 38 and coupling member 18.

Figure 5:
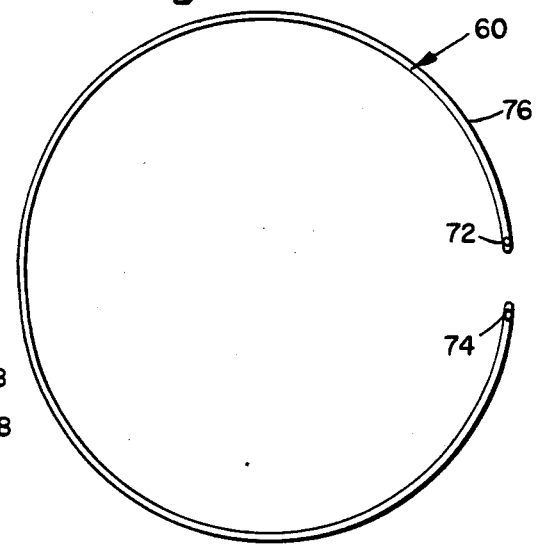
FIG. 5 is a front elevation of the locking spring form shown in the previous Figures.
Figure 6:
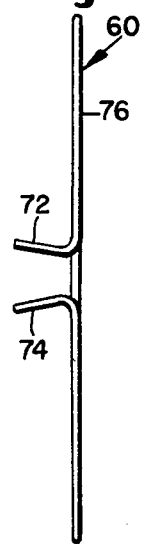
FIG. 6 is a side elevation of the locking spring shown in FIG. 5.

Referring to FIGS. 3, 5 and 6, spring member 60 approaches the form of a ring and terminates in two free ends or end portions 72 and 74 which are circumferentially spaced apart from one another by a relatively small distance. The circumferential spacing between end portions 72 and 74 is small enough to permit the end portions to be grasped and squeezed together by hand or by a pair of pliers or other tool for the purpose of flexing spring member 60. In the illustrated embodiment, end portions 72 and 74 are angularly spaced apart by an angle of about 30 degrees.

As best shown in FIG. 5, spring member 60 is formed from suitable spring wire and has a circumferentially extending body portion 76 extending between and interconnecting end portions 72 and 74. In the relaxed, unflexed condition of spring member 60, body portion 76 preferably has an elliptical shape (that is, follows an elliptical line).

End portions 72 and 74 extend generally axially of housing 38 and transversely of the plane of body portion 76 as best shown in FIGS. 3 and 6. In the relaxed, unflexed condition of spring member 60 shown in FIGS. 5 and 6, end portions 72 and 74 diverge slightly away from one another.

By gripping end portions 72 and 74 to deflect them towards one another to positions shown in phantom lines at 78 (FIG. 3), body portion 76 will contract to more closely approach a uniformly diametered ring configuration.

Referring back to FIG. 3, the enlarged recessed section 46 of coupling member 18 is interiorly formed with a circumferentially radially inwardly opening groove 80 which aligns with groove 56 when tubular housing 38 is fully threaded into coupling member 18. In the assembled position of parts shown in FIG. 3, the spring member's body portion 76 is partially received in groove 56 and partially received in groove 80 to axially lock coupling member 18 and housing 38 to one another and to thus prevent relative axial displacement between coupling member 18 and housing 38. Spring member 60 is confined against relative axial displacement on housing 38 by abutment of body portions 76 with shoulders 52 and 54. Shoulder 54, which lies adjacent to the outer end of housing 38, is circumferentially interrupted to provide a circumferentially extending opening 82 (see FIG. 1) through which the spring member's end portions 72 and 74 extend for access upon uncoupling coupling members 18 and 20 from one another. As shown in FIG. 1, the longitudinal axis of shaft 42 lies in a diametrical plane which extends medially between the spring member's end portions 72 and 74.

Referring again to FIG. 3, spring member 60 is preferably formed with a circular cross section. The radial depth of groove 56 is slightly greater than the cross sectional diameter of the spring member's body portion 76 so that upon squeezing end portions 72 and 74 together, body portion 76 will be fully received in groove 56 at a position where it clears groove 80 and the interior periphery of the coupling member's recessed section 46. The radial depth of groove 80, on the other hand, is more shallow and is significantly less than the cross sectional diameter of the spring member's body portion 76. In the illustrated embodiment, the radial depth of groove 80 is equal to one-half the cross sectional diameter of the spring member's body portion 76 so that when spring member 60 is allowed to flex outwardly into groove 80, it will be constrained against expansion to a position where it removed from groove 56. In its locking position shown in FIG. 3, spring member 60 seat against the bottom wall of groove 80. The procedure for installing check valve assembly 12 in coupling member 18 and for coupling members 18 and 20 together follows.

Figure 4:
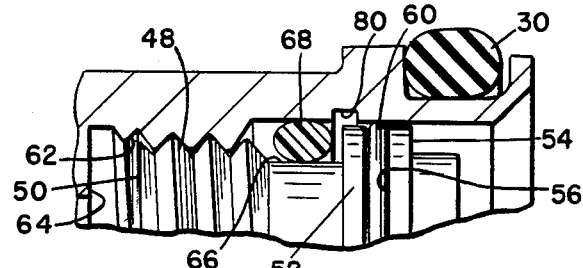
FIG. 4 is an enlarged fragmentary longitudinal section similar to FIG. 3, but showing the male part (a check valve housin only partially threaded into the female part (a coupling member)

After check valve assembly 12 is assembled, spring member 60 is positioned on housing 38 between shoulders 52 and 54, and housing 38 is threaded into coupling member 18. Because of its unflexed eliptical shape, a segment of the springe member's body portion 76 will protrude beyond groove 56 at a position where it is engaged by a chamfered flared mouth 84 of the coupling member's end section 46 and then by the coupling member's cylindrical surface 70 as housing 38 is threaded into coupling member 18, causing body portion 76 to contract into groove 56 as shown in FIG. 4. Upon fully threading housing 38 into coupling 18 to a position where grooves 56 and 80 radially align with one another, the spring member's body portion 76 will expand outwardly to snap into groove 80, thus locking housing 38 and coupling member 18 against relative axial displacement to one another. Thereafter, coupling members 18 and 20 may be coupled to one another by inserting coupling members 18 and 20 into sleeve 24, by then mounting the split coupler 26 on sleeve 24 and finally by actuating spring clip 28 to circumferentially lock the split coupler halves together at a position where sleeve 24 is axially confined between the split coupler's shoulders 34 as shown in FIG. 1.

When the check valve in coupling member 18 is closed (as when the fluid pressure on the downstream side of the check valve is greater than the fluid pressure on the upstream side of the check valve), the fluid pressure acting against valve member 40 applies a force tending to axially separate housing 38 from coupling member 18. Because of the V-shaped thread angle of the threaded sections 48 and 62, the force resulting from the fluid pressure will develop two force vectors or components, of which one is much greater in magnitude than the other. The larger force vector will be absorbed by the threaded engagement of sections 48 and 62. The much smaller force vector will be absorbed by spring member 60. Accordingly, most of the force tending to axially separate housing 38 and coupling member 18 from one another will be absorbed by the threaded sections 48 and 62, and only a small proportion of the separating force will be absorbed by spring member 60, thus reducing the likelihood of failure of the spring member under the influence of fluid pressure in the coupling.

In order to remove check valve assembly 12 from coupling member 18, spring clip 28 is first operated to release the coupling halves of split coupler 26, thus permitting the split coupler to be removed from retaining sleeve 24. Thereafter, coupling member 18 is removed from retaining sleeve 24 simply by sliding it out of the sleeve to expose and permit access to the grippable end portions 72 and 74 of spring member 60. End portions 72 and 74 thus may be grasped between one's fingers or by a pair of pliers or other tool to flex and squeeze them together to the position shown in the phantom lines 78, thus causing the spring member's body portion 76 to contract fully into groove 56 at a position where it fully clears the coupling member's recessed section 46. By holding spring member 60 in this contracted condition, housing 38 will be unlocked from coupling member 18, permitting housing 38 to be unthreaded from coupling member 18 and thus facilitating the removal of check valve assembly 12 from coupling member 18.

It will be appreciated that spring member 60 and grooves 56 and 80 may be modified to make the spring lock work in a reverse mode. This may be accomplished simply by making the radial depth of groove 56 equal to one-half the diameter of spring member 60, by making the radial depth of groove 80 slightly greater than the diameter of spring member 60 and by crossing end portions 72 and 74 in such a manner that when they are squeezed together, body portion 76 will expand fully into groove 80 thus unlocking housing 38 from coupling member 18.

As best shown in FIG. 3, the spring bias of spring member 60 is such that when member 60 is in its locking position, end portions 72 and 74 are urged into seating engagement with opposed, circumferentially directed end faces 88 and 90 of shoulder 54, thereby preventing rotation of spring member 60 relative to housing 38. End faces 88 and 90 delimit opening 82.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An assembly comprising a female threaded member, a male threaded member threaded into said female member, a spring member terminating in free spaced apart end portions and having a curved body portion extending between said end portions, said female member having a radially inwardly opening circumferentailly extending groove and said male member having a radially extending outwardly opening circumferentially extending groove, said grooves being radially opposed to one another for receiving said spring member when said male member is threaded into said female member, the curvature of said spring member being such that when the spring member is received in both of said grooves it locks said male and female members against relative axial displacement, the groove on one of said male and female members being circumferentailly interrupted to define an opening, said end portions of said spring member extending transversely of said body portion and through said opening for access to enable the end portions to be gripped and moved relative to each other to flex said body portion to a shape where it it entirely removed from one of said grooves to thereby unlock said male and female members from one another thereby permitting said male and female members to be disengaged from one another.

2. The assembly defined in claim 1 wherein said spring member has a preselected cross sectional dimension extending radially relative to said grooves, said one of said grooves having a radial depth which is less than said cross sectional dimension to prevent said spring member from being completely received in said one of said grooves.

3. The assembly defined in claim 2 wherein said one of said grooves is said radially inwardly opening groove.

4. The assembly defined in claim 2 wherein said other of said grooves has a radial depth at least equal to said cross sectional dimension, thereby enabling it to fully received said spring member when said spring member is flexed to the shape where it is removed from said one of said grooves.

5. The assembly defined in claim 4 wherein said one of said grooves is said radially inwardly opening groove, and wherein said other of said grooves is said radially outwardly opening groove.

6. The assembly defined in claim 1, wherein said male and female members are tubular fluid-conveying members, wherein said female member has an interior threaded formation, wherein said male member has an exterior threaded formation threaded into said interior threaded formation, wherein said male member has an exterior cylindrical surface extending axially between said radially outwardly opening groove and said interior threaded formation, wherein said female member has an interior cylindrical surface radially opposing said exterior cylinder surface and extending axially between said interior threaded formation and said radially inwardly opening groove, and wherein an elastically deformable seal ring is compressed between said exterior and interior cylindrical surfaces to establish a fluid tight seal between said male and female members.

7. The assembly defined in claim 6, including a check valve mounted for displacement between opened and closed positions on said male member.

8. The assembly defined in claim 7, including a further tubular fluid conveying member, and means for selectively coupling said female member and said further tubular member together.

9. The assembly defined in claim 1 wherein the body portion of said spring follows a non-circular curvature when said spring member is in its relaxed, unflexed condition, and wherein said spring member is flexed into one of said grooves by engagement with a circumferential surface on one of said male and female members as said male member is threaded into said female member, such that upon bringing said grooves into radial alignment with one another, said spring member is self-biased to snap into the other of said grooves to assume a locking position where it lies in both of said grooves.

* * * * *